United States Patent [19]

Ellis

[11] Patent Number: 5,184,312
[45] Date of Patent: Feb. 2, 1993

[54] DISTRIBUTED BUILT-IN TEST EQUIPMENT SYSTEM FOR DIGITAL AVIONICS

[75] Inventor: Gordon F. Ellis, Woodinville, Wash.

[73] Assignee: The Boeing Company, Seattle, Wash.

[21] Appl. No.: 692,781

[22] Filed: Apr. 26, 1991

Related U.S. Application Data

[63] Continuation of Ser. No. 793,586, Oct. 13, 1985, abandoned.

[51] Int. Cl.$^5$ .............................................. G06F 11/00
[52] U.S. Cl. .............................. 364/551.01; 364/580; 371/18
[58] Field of Search ............... 364/550, 551.01, 480, 364/481, 424.01, 424.03, 580; 371/15, 16, 18, 25; 340/507, 514, 945; 73/178 R

[56] References Cited

U.S. PATENT DOCUMENTS

| | | | |
|---|---|---|---|
| 3,603,948 | 9/1971 | Medünski | 340/214 |
| 3,623,011 | 11/1971 | Barnard, Jr. et al. | 340/172.5 |
| 3,659,273 | 4/1972 | Knauft et al. | 340/172.5 |
| 3,678,256 | 7/1972 | Harenberg, Jr. | 235/150.2 |
| 3,783,255 | 1/1974 | Buedel et al. | 235/153 |
| 3,798,614 | 3/1974 | Meadows et al. | 340/172.5 |
| 3,805,038 | 4/1974 | Buedel et al. | 235/153 |
| 3,813,647 | 5/1974 | Loo | 340/172.5 |
| 3,909,802 | 9/1975 | Cassarino, Jr. et al. | 340/172.5 |
| 3,916,177 | 10/1975 | Greenwald | 235/153 |
| 3,967,103 | 6/1976 | Cachuela et al. | 235/153 |
| 4,155,116 | 5/1979 | Tawfik et al. | 364/119 |
| 4,204,249 | 5/1980 | Dye et al. | 364/200 |
| 4,315,311 | 2/1982 | Causse et al. | 371/18 X |
| 4,334,308 | 6/1982 | Thinschmidt et al. | 371/29 |

(List continued on next page.)

OTHER PUBLICATIONS

McCreary, T. R. et al., *Bit/Fit Maturity Before First Flight*, IEEE Publication, CH1554-5-1/80/0000-0853, 1980, pp. 853-859.
Conference proceedings of IEEE 1980 NAECON, Dayton, Ohio, May 20-22, 1980, pp. 853-859.

*Primary Examiner*—Parshotam S. Lall
*Assistant Examiner*—Michael Zanelli
*Attorney, Agent, or Firm*—Christensen, O'Connor, Johnson & Kindness

[57] ABSTRACT

A distributed BITE system for a digital avionic system. The avionic system comprises a plurality of LRUs and digital communication devices through which the LRUs can transmit and receive data in a predefined format comprising multiple bit communication words. The avionic system further includes an interface unit (12) and at least one distributed computer system (14, 16, 18). The interface unit includes a control/display unit (20) that comprises a display screen (22) and input device such as a keyboard (24, 26). The digital communication devices may include a first bus (40) through which the interface unit can transmit communication words to the distributed computer system, and a second bus (42, 44, 46) through which the distributed computer system can transmit communication words to the interface unit. The BITE system comprises a distributed BITE program (72, 74, 76) in the distributed computer system, and a passthrough program (78) in the interface unit. The distributed BITE program has an interactive structure wherein the program receives input data including commands provided by an operator and provides output data including fault data for use by the operator. The distributed computer system is adapted to receive its input data over the first bus in the predefined format, and to transmit its output data onto the second bus in the same format. The passthrough program comprises receiving input data from the control/display unit, formatting the input data in the predefined format, and causing the input data to be transmitted to the distributed computer system over the first bus. The passthrough program also comprises receiving output data from the second bus and causing the output data to be transmitted to the control/display unit for display on the display screen thereof.

15 Claims, 7 Drawing Sheets

U.S. PATENT DOCUMENTS

| | | | |
|---|---|---|---|
| 4,334,425 | 6/1982 | Crane | 364/551 X |
| 4,356,546 | 10/1982 | Whiteside et al. | 371/67 X |
| 4,393,492 | 7/1983 | Jackson et al. | 371/29 X |
| 4,399,502 | 8/1963 | MacDonald et al. | 364/189 |
| 4,414,539 | 11/1983 | Armer | 340/507 X |
| 4,424,576 | 1/1984 | Lange et al. | 371/16 X |
| 4,433,413 | 2/1984 | Fasang | 371/25 |
| 4,454,588 | 6/1984 | O'Brien | 364/551 |
| 4,489,414 | 12/1984 | Titherley | 371/15 X |
| 4,498,172 | 2/1985 | Bhavsar | 371/15 X |
| 4,510,583 | 4/1985 | Walz et al. | 364/9003,603,948 |
| 4,513,419 | 4/1985 | Small | 371/25 X |
| 4,554,636 | 11/1985 | Maggi et al. | 324/73 AT X |
| 4,581,738 | 4/1986 | Miller et al. | 371/18 |
| 4,590,550 | 5/1986 | Eilert et al. | 364/551 |
| 4,626,996 | 2/1986 | Arlott | 364/550 |
| 4,633,466 | 12/1986 | Laws et al. | 371/16 |
| 4,646,298 | 2/1987 | Laws et al. | 371/16 |
| 4,651,563 | 3/1987 | Zweifel | 364/551 X |
| 4,675,675 | 6/1987 | Corwin et al. | 340/945 |
| 4,703,325 | 11/1987 | Chamberlin et al. | 364/551 |
| 4,799,159 | 1/1989 | Davidson et al. | 364/424.06 |

Fig. 1.

| P | SSM | DATA | | LABEL | |
|---|---|---|---|---|---|
| 32 | 31 30 | 29 | 9 | 8 | 1 |

Fig. 2a.
PRIOR ART

| P | SSM | NOT USED | ADDRESS | WORD COUNT | 357 | |
|---|---|---|---|---|---|---|
| 32 | 31 30 | 29  23 | 22  17 | 16  9 | 8 | 1 |

Fig. 2b.
PRIOR ART

| P | SSM | DATA #3 | DATA #2 | DATA #1 | 357 | |
|---|---|---|---|---|---|---|
| 32 | 31 30 | 29  23 | 22  16 | 15  9 | 8 | 1 |

Fig. 2c.
PRIOR ART

| P | SSM | NOT USED | WORD COUNT | 356 | |
|---|---|---|---|---|---|
| 32 | 31 30 | 29  17 | 16  9 | 8 | 1 |

Fig. 2d.
PRIOR ART

| P | SSM | DATA #3 | DATA #2 | DATA #1 | 356 | |
|---|---|---|---|---|---|---|
| 32 | 31 30 | 29  23 | 22  16 | 15  9 | 8 | 1 |

DISTRIBUTED BUILT-IN TEST EQUIPMENT SYSTEM FOR DIGITAL AVIONICS

This application is a continuation application based on prior copending application Ser. No. 06/793,586, filed on Oct. 13, 1985, now abandoned.

FIELD OF THE INVENTION

The present invention relates to built-in test equipment systems and, in particular, to a distributed built-in test equipment system for use in digital avionics.

BACKGROUND OF THE INVENTION

As airplane avionic systems have become more and more sophisticated, an increased need has developed to provide line maintenance technicians with maintenance assistance features. In response to this need, airline companies have required airplane manufacturers to provide built-in test equipment (BITE) for the various onboard avionic systems. The BITE systems provide diagnostic information in the case of system malfunctions, and related maintenance features.

Avionic systems are comprised of numerous line replaceable units (LRUs), each of which constitutes a replaceable electronics component. The early attempts at providing BITE within analog avionic systems were not particularly successful, and typically resulted in the use of shotgun maintenance techniques wherein many LRUs or entire systems were replaced until a fault was corrected. With the advent of digital avionics, the opportunity arose to provide sophisticated and effective BITE systems. In a modern digital avionic system, each LRU communicates with other LRUs primarily by means of serially transmitting and receiving digital information formatted in standarized multi-bit words. For example, an LRU may sense the altitude of the aircraft and then formulate a digital word that, among other things, includes a binary representation of the altitude. This digital word is transmitted to another LRU which, for example, might be a digital display system on the instrument panel in the cockpit. The display unit decodes the digital word and displays the altitude in an appropriate decimal format. Other system subgroupings may consist of analog sensors that communicate via discrete and dedicated analog signal lines.

While the LRU altimeter is but one example of a line replaceable subsystem, it will be appreciated that the actual avionic systems in large sophisticated aircraft involve many diverse LRUs which are interconnected by serial buses to form a complex intelligence system. Because of the complexities and scale of such avionic systems, the aircraft industry has taken steps to standardize the digital words that are transmitted and received by the various LRUs so as to facilitate the interchangeability and maintenance of such components.

One aspect of this standardization is that a large portion of the information transmitted and/or received by the LRUs is in the form of standardized digital communication words, wherein each word includes a data field, a label, and other ancillary information. An example of such a standardized digital word is specified in a publication prepared by Aeronautical Radio, Inc. of Annapolis, Md., entitled "Mark 33 Digital Information Transfer System (DITS) Specification No. 429-4", published August 1980, the contents of which are incorporated herein by reference. The communication word specified in this specification is known in the industry as the ARINC 429 word. The ARINC 429 word is comprised of 32 bits in a standardized format which can be used to represent over 300 different functions or parameters generated and/or received by commonly employed LRUs of an avionic system. The information carried by the various 32 bit communication words flows from one LRU to one or more other LRUs over a bus comprising a twisted and preferably shielded pair of wires in which only unidirectional serial flow of the digital word or words is permitted. Thus, when bidirectional communication is required between two LRUs, they will be coupled by at least two separate buses.

Previously, to provide BITE systems in digital avionic systems, a centralized BITE scheme was used wherein fault information detected by an LRU was encoded by the LRU and transmitted to a centralized computer unit. This centralized computer unit provided all of the means for displaying data and interacting with a maintenance technician, and included means for converting the binary codes generated and transmitted by the LRUs into English language messages. Because in these systems the LRU that conducts the test or detects the failure does not actually present the fault data, the systems are not user oriented or "friendly". In such systems, the binary codes transmitted from the testing LRU to the display unit have to cover complex subsystems, such as an autopilot, as well as simpler subsystems, such as entertainment subsystems. The requirement for a single BITE system to cover such diverse subsystems tends to make the BITE system too rigid and limits its effectiveness.

SUMMARY OF THE INVENTION

The present invention provides a distributed or federated BITE system for an onboard digital avionic system that overcomes the limitation described above. In the BITE system of the present invention, the BITE functions are distributed among a number of BITE systems associated with different computer systems of the avionic system. However, the various distributed BITE systems all interact with a maintenance technician through a single interface unit that includes a display screen and input means such as a keyboard. In one preferred embodiment, the interface unit comprises the flight management computer system, and the fight management computer system includes passthrough logic for enabling the BITE system of a different computer system to communicate with an operator through such display screen and input means. In operation, each distributed BITE system controls the display screen and keyboard to the same extent as if the display screen and keyboard were uniquely associated with that BITE system. The messages transmitted between the interface unit and distributed BITE system include natural (e.g., English) language text messages rather than or in addition to binary codes. In this manner, each distributed BITE system can generate its own unique messages and receive unique commands, rather than be limited to a universal menu applicable to all BITE systems. The result is a significant increase in the ease of use of the BITE systems, and in the speed with which maintenance operations can be accomplished.

In one aspect, the digital avionic system in which the present invention is incorporated comprises a plurality of LRUs and digital communication means through which the LRUs can transmit and receive data. Each LRU is adapted to transmit and receive such data in a predefined format comprising one or more multiple bit communication words. The avionic system further comprises interface means and a distributed computer system. The interface means includes control/display means having a display screen and input means such as a keyboard. The BITE system comprises a distributed BITE program in the distributed computer system and passthrough means in the interface means. The distributed BITE program has an interactive structure wherein the program receives input data, including commands generated by an operator, and provides output data, including fault data for use by the operator. The distributed computer system is adapted to receive input data from the interface means via the digital communication means in said predefined format, and to transmit output data to the interface means via the digital communication means in said predefined format. The passthrough means comprises means for receiving input data from the control/display means, means for causing input data so received to be formatted in the predefined format and transmitted from the interface means to the distributed computer system via the digital communication means, means for receiving output data transmitted from the distributed computer system to the interface means via the digital communication means, and means for causing output data so received to be transmitted to the control/display means for display on the display screen.

The interface means may comprise a central computer system, and the BITE system may further comprise a central BITE program in the central computer system. The central BITE program has an interactive structure wherein the program receives input data, including commands from the operator, via the control/display means and provides output data, including fault data, to the operator via the control/display means. In such an embodiment, the interface means includes means for enabling the operator to select either the central or distributed BITE program, and means for activating the passthrough means when the distributed BITE program is selected. The digital communication means may comprise a first bus through which input data for the distributed BITE program is transmitted from the interface means to the distributed computer system, and a second bus through which output data provided by the distributed BITE program is transmitted from the distributed computer system to the interface means. Unique label codes may be used to identify input and output data for the distributed BITE program, and the input and output data preferably includes a series of character codes representing characters that are to be displayed on the display screen or that have been entered via the keyboard.

In a further aspect of the invention, the avionic system comprises first and second distributed computer systems, and the BITE system comprises first and second distributed BITE programs in the first and second distributed computer systems, respectively. In such an embodiment, the passthrough means includes means for enabling the operator to select either the first or second distributed BITE program.

In a further aspect of the invention, the interface means including the control/display means is provided as a separate element of the BITE system, rather than being a component of the avionic system. In a related embodiment, separate control/display means and interface means are provided as part of the BITE system. The interface means includes the passthrough means, as well as means for transmitting data to and receiving data from the control/display means.

DETAILED DESCRIPTION OF THE INVENTION

Figure 1:
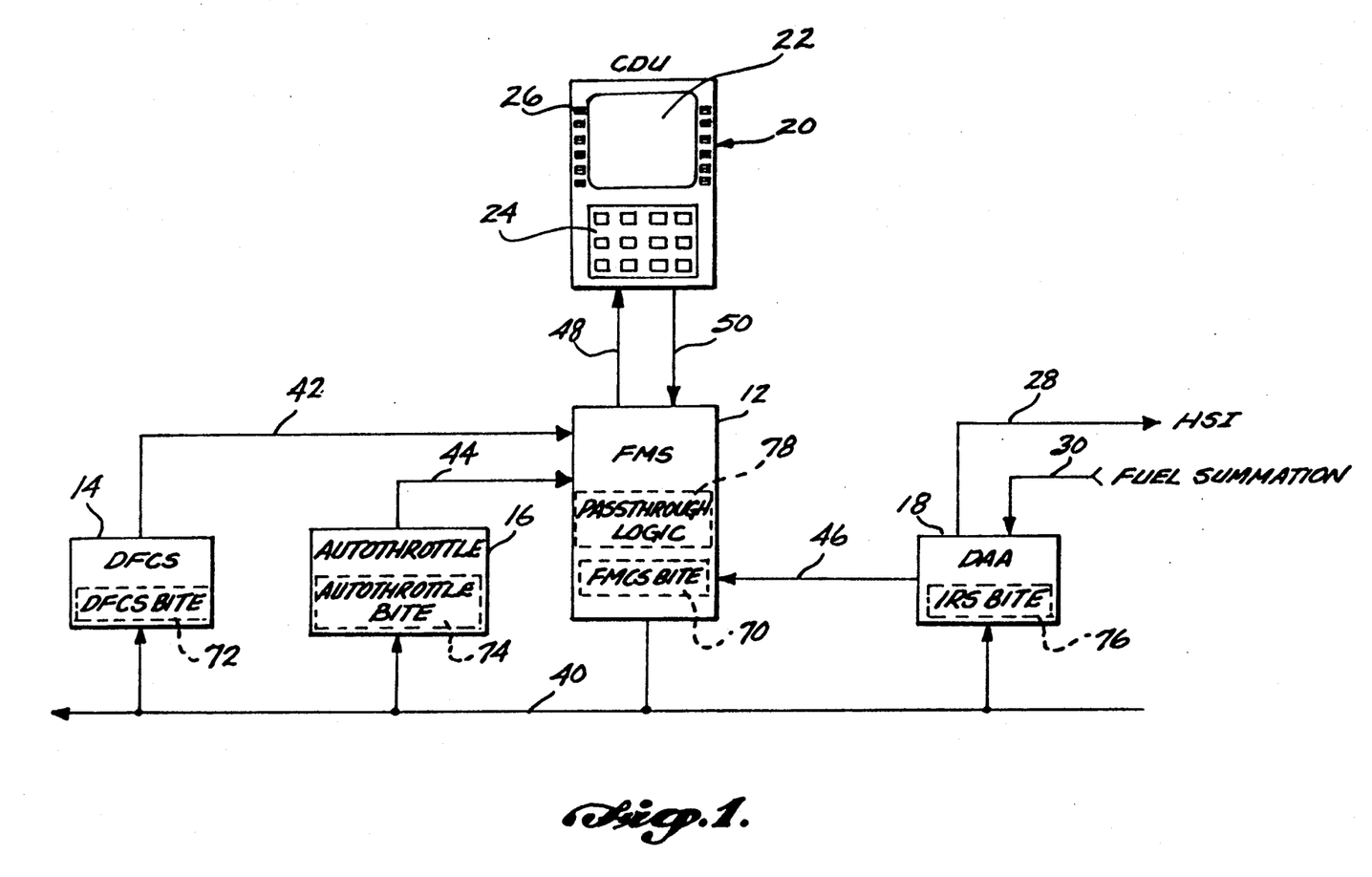
FIG. 1 is a block diagram of a portion of a digital avionic system that includes the distributed BITE system of the present invention.

FIG. 1 schematically illustrates a portion of a modern digital avionic system that includes a distributed BITE system according to the present invention. The digital avionic system comprises flight management computer system (FMCS) 12, digital flight control system (DFCS) 14, autothrottle 16, digital-to-analog adapter (DAA) 18, and control display unit (CDU) 20. CDU 20 represents one of the principal interfaces between the aircraft crew and the avionic system, and comprises display screen 22, keyboard 24 and line select keys 26. Keyboard 24 may comprise a conventional keyboard including alphabetic, numeric and special function keys. Line select keys 26 are used by the crew to select options presented on display screen 22, as discussed in greater detail below. CDU 20 interacts with the avionic system solely through FMCS 12.

The principal functions of FMCS 12 include flight plan management, navigation, flight performance management, and control of CDU 20. By way of example, the aircraft crew may use the FMCS to enter waypoints and other parameters specifying a given flight. The FMCS will respond by providing a flight plan including target airspeeds, target altitudes, target vertical speeds and roll commands for the various phases of the flight. DFCS 14 is a computer system that includes an autopilot to control the aircraft's flight path in the pitch and roll axes. The DFCS also controls the aircraft in response to steering commands generated by the FMCS in accordance with the flight plan stored or entered through keyboard 24. Autothrottle 16 is a computer system that controls the thrust of the aircraft in response to signals and commands from FMCS 12. Such signals include data regarding air temperature, target thrust (N1), gross weight, and minimum airspeed. DAA 18 is a computer system that is provided to interface the digital avionic system with instrument systems that use analog signals. FIG. 1 shows two examples of such analog signals, a horizontal situation indicator (HSI) signal output by DAA 18 on line 28, and a fuel summation signal input by DAA 18 on line 30. The HSI is a cockpit mounted instrument that displays the course pointer, drift angle cursor, lateral deviation bar and vertical deviation pointer to the crew in response to analog signals received on line 28. The fuel summation signal is an analog signal that indicates the total remaining fuel onboard the aircraft. It is to be understood that the digital avionic system diagrammed in FIG. 1 is not intended to represent a complete functional avionic system. For example, major subsystems not illustrated in FIG. 1 include the digital air data computer that provides altitude, airspeed, temperature and other data, and the inertial reference system (IRS) that provides attitude, velocity and position information.

Figure 2A:
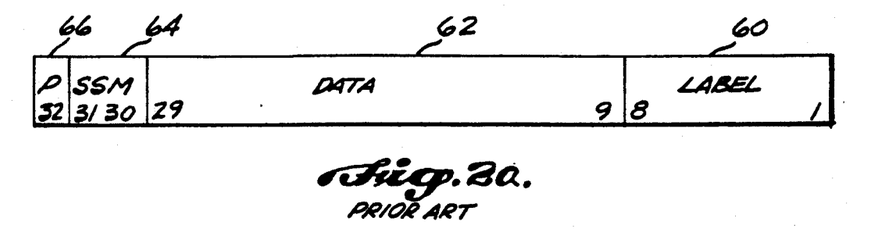
FIGS. 2a-2e are charts showing the format of ARINC 429 communication words.

Communications between the subsystems shown in FIG. 1, and other aircraft subsystems, is preferably carried out by means of a standardized protocol such as the above-mentioned specification No. ARINC 429-4 and referred to hereinafter as the ARINC 429 protocol. In the ARINC 429 protocol, systems communicate by means of ARINC 429 words. An ARINC 429 word is comprised of 32 bits in a standardized format that can be used to represent over 300 different functions or parameters generated and/or received by commonly employed avionic subsystems. ARINC 429 words are serially transmitted from one subsystem to another over a twisted and shielded pair of wires in which only one direction of data flow is permitted. Such wire pairs will herein be referred to as buses. In the avionic system shown in FIG. 1, bus 40 is used to transmit ARINC 429 words from FMCS 12 to DFCS 14, autothrottle 16, DAA 18 and to other LRUs in the avionic system. The data flow on bus 40 is unidirectional from the FMCS to the other subsystems. DFCS 14, autothrottle 16 and DAA 18 transmit ARINC 429 words to FMCS 12 via buses 42, 44 and 46, respectively. Other buses (not shown) may be used to transmit information between various systems independently of FMCS 12. FMCS 12 and CDU 20 exchange ARINC 429 words via buses 48 and 50. A typical format for an ARINC 429 word is illustrated in FIG. 2a. The 32-bit word comprises label field 60 (bits 1-8), data fields 62 (bits 9-29), sign/status matrix (SSM) field 64 (bits 30-31), and parity field 66 (bit 32). SSM field 64 contains a 2-bit code that has the general function in the ARINC 429 protocol of indicating the initial, intermediate and final words of a transmitted transmission message or data train. For the purposes of the distributed BITE system of the present invention, SSM field 64 will always contain the code 10 for an initial word, 00 for an intermediate word, and 01 for a final word of a message.

In accordance with the present invention, a built-in test equipment (BITE) system is provided in which the BITE functions are distributed among various subsystems of the avionic system, but are accessed through a single interface, i.e., through CDU 20. In the example shown in FIG. 1, the BITE system is comprised of four separate BITE systems, FMCS BITE 70 in FMCS 12, DFCS BITE 72 in DFCS 14, AUTOTHROTTLE BITE 74 in autothrottle 16, and IRS BITE 76 in DAA 18. The individual BITE systems are not per se the subject of the present invention, and each may comprise any known arrangement of built-in test equipment that includes an interactive computer program plus associated hardware for monitoring and testing the computer system in which the BITE system resides, as well as for monitoring and testing other computer systems and LRUs. For example, IRS BITE 76 is preferably responsible for testing the inertial reference system.

In the BITE system of the present invention, each BITE program receives commands and input from keyboard 24 and line select keys 26 of CDU 20, and displays output on display screen 22 of CDU 20. When a BITE system other than FMCS BITE 70 is active, FMCS 12 operates in a passthrough mode using pass-through logic 78. In the passthrough mode, data including natural language (e.g., English messages) received from an operator via CDU 20 is simply passed through FMCS 12 onto bus 40 and received by the active BITE system, for example DFCS BITE 72. Similarly, data including natural language messages generated by DFCS BITE 72 are transmitted to FMCS 12 via bus 42, and passthrough the FMCS to CDU 20 via bus 48. In this mode of operation, DFCS BITE 72 has essentially taken over CDU 20, and FMCS 12 is merely operating as a buffer or passthrough unit. The principal advantage of the distributed BITE scheme illustrated in FIG. 1 is that the tests performed by the individual BITE systems are not constrained by the information protocol scheme for communicating between different portions of the avionic system. As a result, the BITE systems are easier to use and are more user friendly, features that result in faster maintenance, particular line maintenance when the airplane is between scheduled flights. Faster maintenance in turn provides a greater likelihood of meeting tight airline schedules.

It is to be understood that the distributed BITE system of the present invention may be implemented using a separate interface unit that includes a display screen, input means such as a keyboard, and passthrough logic or its equivalent. Referring to FIG. 1, such an interface unit would preferably be independent of FMCS 12, in which case FMCS BITE 70 would function as a distributed BITE system. Alternatively, the distributed BITE system of the present invention could be implemented using a unit identical to CDU 20 and a separate passthrough unit. For each of these alternate embodiments, buses would be provided to enable the passthrough or interface unit to engage in two way communication with each computer system that included a distributed BITE system. These alternate implementations, in which the passthrough unit is independent of FMCS 12, would in principle permit operation of the distributed BITE system from any point in the airplane. On the other hand, the system shown in FIG. 1, wherein the distributed BITE system is accessed from the cockpit CDU, provides the advantage that no additional hardware is required to implement the distributed BITE system. With respect to any of the described BITE system implementations, it will be appreciated that the system could readily be expanded to accommodate any number of distributed BITE systems throughout the aircraft.

The BITE systems shown in FIG. 1 are described in greater detail below. However, a BITE system can be generally described as comprising both dedicated hardware and a computer program that includes both in-flight and ground portions. The principal function of the in-flight portion of each BITE program is to store data relating to faults that are detected during operation of the aircraft. In a typical BITE system, data for up to nine prior flights can be simultaneously stored. The ground portion of each BITE program provides means for a ground maintenance technician to retrieve fault data from any one of a number of prior flights, to initiate test sequences to isolate the line replaceable unit (LRU) responsible for a given fault, and to initiate test sequences to verify system operation after a given LRU has been replaced. Then in-flight portion of a BITE program essentially operates autonomously without operator intervention. However, the ground portion of a BITE program must include means for interactively communicating with the maintenance technician. For example, the ground portion of a BITE program must include means for presenting stored fault data to the technician, and for receiving the technician's commands concerning the retreival of stored fault data and the initiation of test or verification sequences. Thus, in the distributed BITE system illustrated in FIG. 1, means must be provided for enabling each BITE program to interactively communicate with a user via CDU 20. In particular, means must be provided for enabling the screen output (data, operator prompts, etc.) of each BITE program to appear on display screen 22, and for enabling data entered by an operator via keyboard 24 or line select keys 26 to be received and acted upon by the BITE program.

Figure 2B:
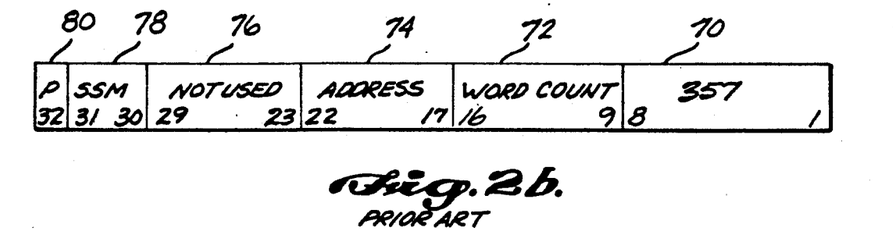
Figure 2C:
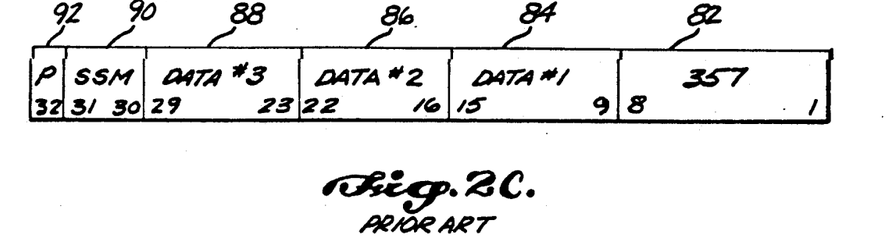

In accordance with the present invention, the required exchange of information between each distributed, BITE-containing computer system and the CDU-/interface/passthrough unit is accomplished over serial buses by means of the ARINC 429 protocol. The implementation of this protocol in the distributed BITE system may be described with reference to FIG. 2b-2e. With reference to the embodiment shown in FIG. 1, when data is to be sent from FMCS 12 to one of the distributed BITE programs, the data is sent by ARINC 429 words that have the predefined code 357 (octal) in their label fields, such words being hereinafter referred to as 357 words. Each complete message from the FMCS to one of the distributed BITE programs consists of a 357 start word and, optionally, one or more 357 continuation words. The format of a 357 start word is illustrated in FIG. 2b, and includes label field 70, word count field 72, address field 74, unused field 76, SSM field 78 and parity field 80. A 357 continuation word is illustrated in FIG. 2c, and comprises label field 82, data fields 84, 86 and 88, SSM field 90 and parity field 92. In both words, the label field contains the code 357. Word count field 72 in the 357 start word contains a binary number representing the total number of 357 continuation words in a given message. All zeros in the word count field indicates that there are no continuation words in the message. Address field 74 contains a six bit code uniquely specifying the computer system (e.g., DFCS 14, autothrottle 16, DAA 18) for which the 357 words are intended. If six bits is insufficient to uniquely address each computer system that contains a distributed BITE system, then address field 74 could be expanded to include some or all of unused field 76, or unused field 76 could be utilized as a subsystem address code. Data fields 84, 86 and 88 of the 357 continuation word contain codes for three characters of the message to be transmitted. A preferred character code is the conventional 7 bit (high order bit not used) ASCII format. As many of the 357 continuation words are transmitted as are required to transmit all of the characters (including any control codes) of a given message. In general, the end of a multiword message is indicated by a 357 continuation word that contains the code 01 in the SSM field. Any unused data fields at the end of a message are filled with zeros to indicate that they contain no data.

Figure 2D:
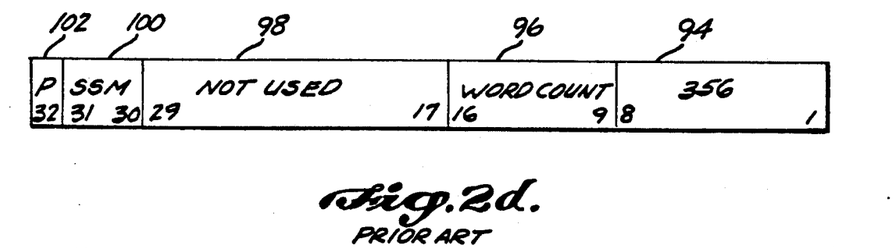
Figure 2E:
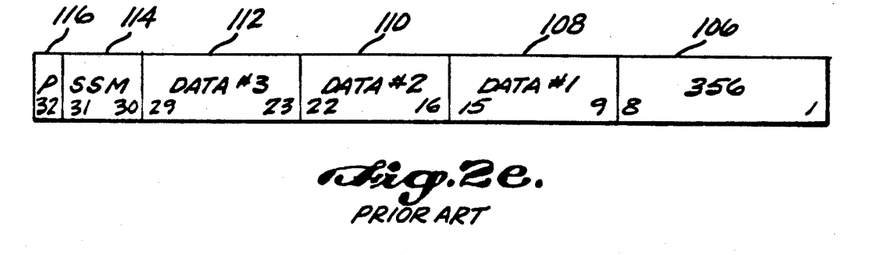

When a given distributed BITE program wishes to send data to FMCS 12 for display on display screen 22, such data is sent by ARINC 429 words having the code 356 in their label fields, such words being referred to herein as 356 words. Each message sent by a distributed BITE program to the FMCS consists of a 356 start word and, optionally, one or more 356 continuation words. The format of a 356 start word is illustrated in FIG. 2d. The 356 start word comprises label field 94, word count field 96, unused field 98, SSM field 100 and parity field 102. A 356 continuation word is illustrated in FIG. 2e, and comprises label field 106, data fields 108, 110 and 112, SSM field 114 and parity field 116. Both words include the code 356 in their label fields. Word count field 96 contains a binary number representing the total number of 356 continuation words in a given message. Zeros are placed in the word count field when there are no continuation words. Data fields 108, 110 and 112 contain codes for three characters (or control codes) of the message (e.g., text string) to be transmitted in 7-bit ASCII format. The end of a multiword 356 message is indicated by a 356 continuation word having an SSM code of 01.

Figure 3:
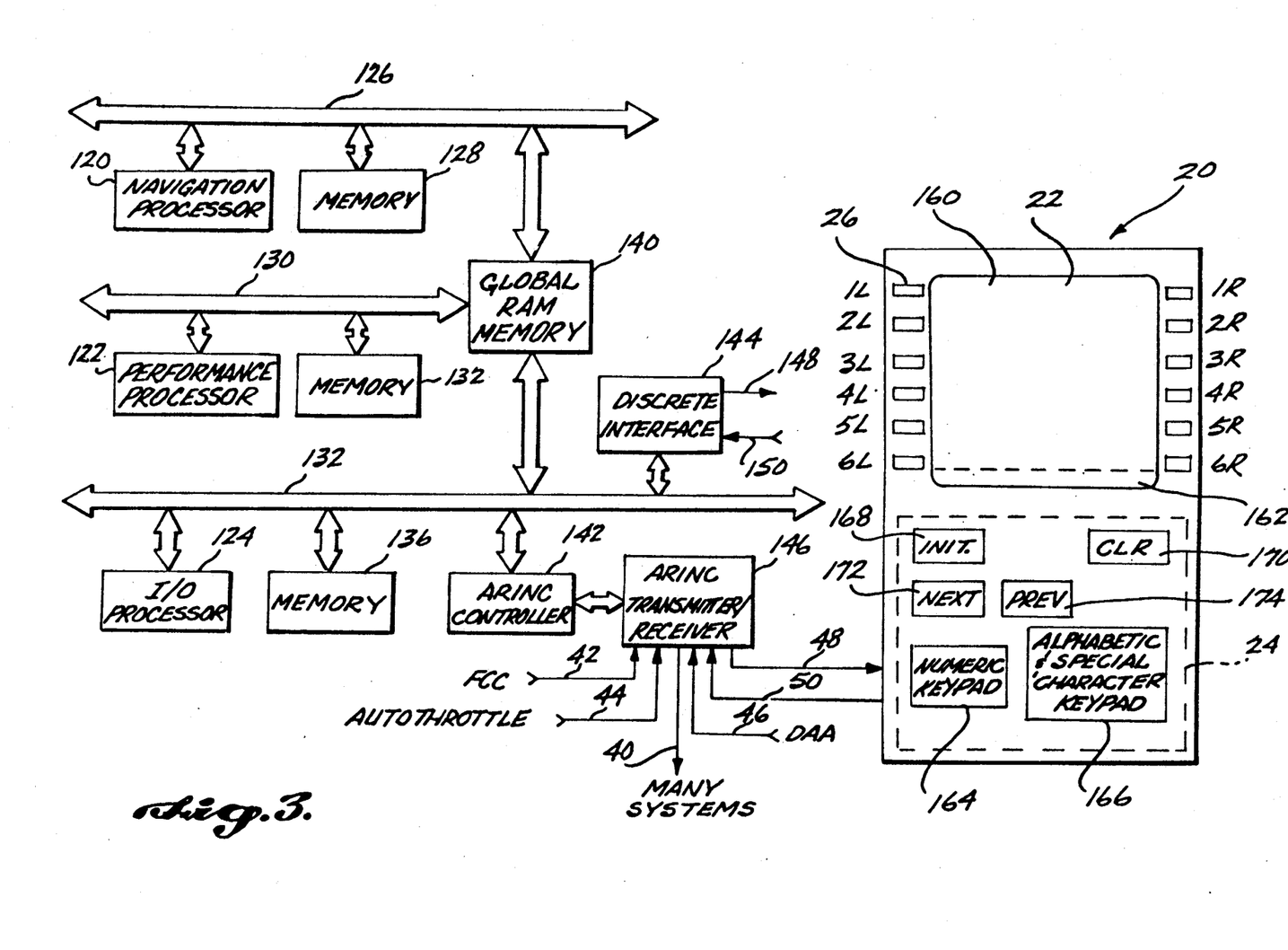
FIG. 3 is a block diagram showing the FMCS and the format of the CDU display screen and keys.

CDU 20 and the internal architecture of FMCS 12 are illustrated in greater detail in FIG. 3. The FMCS is configured as a distributed function multiprocessor having three independent computing units-navigation processor 120, performance processor 122 and I/O processor 124. Associated with navigation processor 120 are bus 126 and memory 128. Memory 128 includes an EPROM program memory, scratch pad RAM, nonvolatile RAM for storage of data during power off periods, and data base RAM for storing a navigational data base. Associated with performance processor 122 are bus 130 and memory 132. Memory 132 includes program memory, scratch pad RAM, and nonvolatile RAM. Associated with I/O processor 124 are bus 134, memory 136 that includes program memory and scratch pad RAM, ARINC controller 142, discrete interface 144, and ARINC transmitter/receiver 146. Buses 126, 130 and 134 are identical to one another but are independent both electrically and physically. Communication between the navigation, performance and I/O computing units is via global RAM memory 140 that is accessible to all processors.

All communication between the FMCS and other systems is handled by I/O processor 124 through ARINC controller 142 and discrete interface 144. ARINC controller 142 controls ARINC transmitter/receiver 146 that in turn is connected directly to the various buses. In a typical avionic system, the ARINC transmitter/receiver would be capable of handling 30 or more incoming buses and 15 or more outgoing buses. Illustrated in FIG. 3 are incoming buses 42, 44 and 46 from the DFCS, autothrottle and DAA respectively, outgoing bus 40 that is connected to numerous systems, and buses 48 and 50 for the exchange of data between the FMCS and CDU 20.

Not all data sent and received by the FMCS is transmitted in the ARINC 429 format. In particular, the FMCS is designed to handle a number of discrete input and output signals via discrete interface 144. In FIG. 3, line 148 designates a set of outgoing discrete signals, and line 150 designates a set of incoming discrete signals. In a typical avionic system, discrete interface 144 may handle 80 or more incoming signals and 5 or more outgoing signals.

The function of performance processor 122 is the calculation and update of aircraft performance parameters. The performance processor has no function with respect to the BITE systems, and will not be discussed further. A principal function of navigation processor 120 is the calculation and update of navigation related information. However, the navigation processor also is responsible for running FMCS BITE 70 (FIG. 1), as well as with providing access to the various distributed BITE programs. A further and related function of navigation processor 120 is the control of CDU 20. All communication between the navigation processor and systems outside FMCS 12 are handled through global RAM memory 140 and I/O processor 124. For example, if navigation processor 120 wishes to send data to CDU 20 for display on display screen 22, it places the data and associated identifying and routing information in global RAM memory 140. Such data is transferred by I/O processor 124 to ARINC controller 142, and the ARINC controller controls ARINC transmitter/receiver 146 such that the data is output on bus 48. A similar sequence applies to incoming data intended for use by the navigation processor.

Referring now to the right-hand side of FIG. 3, CDU 20 comprises previously described display screen 22, keyboard 24 and line select keys 26. The line select keys arrayed along the left-hand side of display screen 22 are designated 1L-6L, and the line select keys arrayed along the righthand side of display screen 22 are designated 1R-6R. Display screen 22 may, by way of example, provide for the display of 14 lines of 24 characters each. In such an embodiment, the display screen is divided into display area 160 comprising lines 1-13, and scratch pad 162 comprising line 14. Display area 160 is used to display data supplied by an applications program, including a BITE program. Scratch pad 162 is used for the display of information keyed-in by an operator via keyboard 24. The control circuitry of the CDU may be of generally conventional design, and include a symbol generator, refresh circuitry for display screen 22, and means for controlling the display screen in response to the receipt of predefined control codes such as carriage return and horizontal tab.

Keyboard 24 comprises numeric keypad 164, alphabetic and special character keypad 166, and a number of special function keys. Four special function keys pertinent to the present invention are shown in FIG. 3, and include initialize (INIT) key 168, clear (CLR) key 170, next-page (NEXT) key 172 and previous page (PREV) key 174. Actuation of numeric keypad 164 or alphabetic and special character keypad 166 results in the keyed characters appearing in scratch pad 162 in the sequence entered. A single operation of the CLR key erases the last scratch pad character entered. Holding the CLR key down for one second clears all of scratch pad 162. Entry of a character when there are already 24 characters in the scratch pad is ignored. When one of the line select keys is actuated, the code for that line select key, together with the contents of scratch pad 162, if any, are transmitted to FMCS 12 via bus 50. At the same time, scratch pad 162 is cleared. Actuation of the INIT, NEXT or PREV keys also results in special codes uniquely identifying those keys being transmitted to the FMCS, as well as in the clearing of the scratch pad. The functions of the INIT, NEXT and PREV keys are described below.

For all aircraft systems including the BITE systems, navigation processor 120 operates CDU 20 based upon a page technique. Each page can be conceived of as a unit of page data that specifies display data to be displayed in display area 160, and command data associated with the line select keys. At any given time, one unit of page data is designated the "active" page. When a given page is active, the display data associated with that page is transmitted by the navigation processor to CDU 20 for display in display area 160. When navigation processor 120 receives data from CDU 20 indicating that a line select key has been pressed, the navigation processor consults the command data for the active page to determine what actions, if any, should be taken in response to actuation of that line select key. In making such determination, the navigation processor may make use of the transmitted data from scratch pad 162.

From the perspective of an operator of the CDU, the terms "page" and "screen" are essentially synonymous with the display data displayed when a given page is active. Suppose, for example, that page x is active, and the display data for page x is therefore displayed upon display area 160. A portion of the page x screen might be a prompt indicating that actuation of line select key 6R will cause the program to jump to page y. When line select key 6R is actuated and the corresponding code received by the navigation processor, the navigation processor consults the command data for page x and determines that the action to be taken is to transfer to page y. The navigation processor therefore redesignates the active page as page y, sends the display data for page y to CDU 20, and then awaits further input. In certain circumstances, a unit of information contains too much data for display at one time upon display area 160, in which case the display data is broken up into a plurality of screens. NEXT key 172 and PREV key 174 are provided for allowing an operator to jump forward and backward among related screens, thereby eliminating the need for prompts in display portion 160 to perform such operations.

Figure 4:
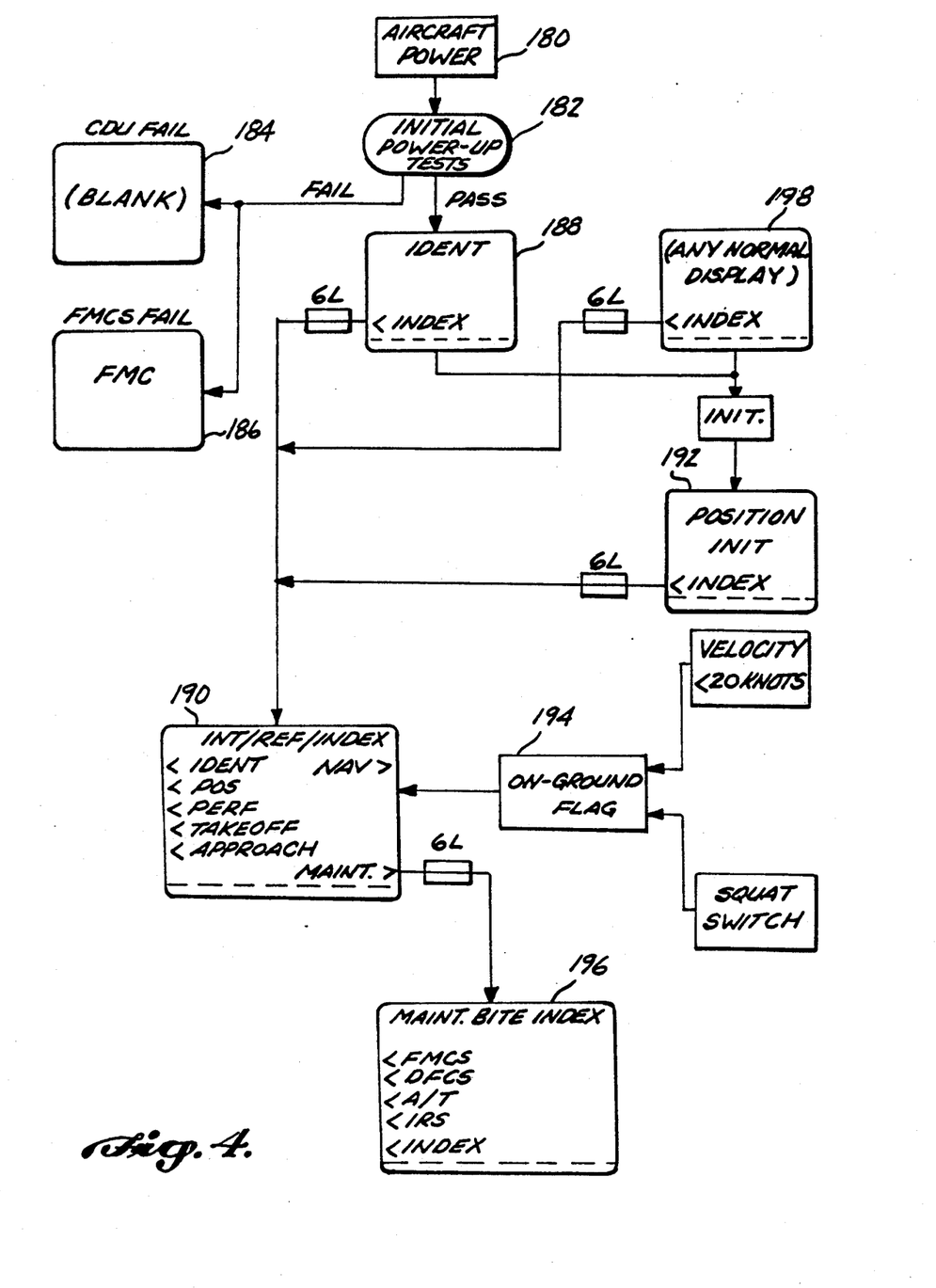
FIG. 4 is a flow diagram showing the process by which the BITE system of the present invention is accessed.

With the background set forth above, it is now possible to describe the method by which the BITE systems of the present invention are accessed. Referring to FIG. 4, when aircraft power is first applied in block 180, the FMCS and CDU, at block 182, each performs a series of conventional power-up functional tests. If the FMCS power-up tests fail, the CDU detects the absence of messages from the FMCS on bus 48, and therefore displays the legend shown by screen 186. If the CDU tests fail, a blank CDU screen appears, as indicated by screen 184. Assuming that the power-up tests are passed, the navigation processor activates an identification page that results in identification screen 188 appearing on display screen 22. Identification screen 188 indicates the aircraft model number, engine model numbers, the identification and expiration date of the installed navigational data base. The identification screen also includes an INDEX prompt comprising a caret followed by the word "index" adjacent line select key 6L. In general, a caret adjacent a line select key indicates that the line select key is active for the current screen and can be used to initiate a system action. Depressing line select key 6L while the identification screen is displayed results in a jump to initial reference index (INIT/REF/INDEX) screen 190. The initial reference screen displays the following prompts: IDENT, POS, PERF, TAKEOFF, APPROACH and NAV, each prompt including a caret associating the prompt with a given line select key. Selecting the IDENT option (i.e., actuating the corresponding line select key) results in a jump to identification screen 188. Selecting the POS option results in a jump to position initialization (POSITION INIT) screen 192 described below. Selecting the performance (PERF) option causes a jump to a performance initialization screen that is used to initialize performance data for use by performance processor 122 (FIG. 3). Selection of the TAKEOFF prompt causes a jump to a take-off data screen that displays take-off information to the crew. Selection of the APPROACH prompt similarly jumps to an approach reference screen that provides airport and approach information to the crew. Selection of the NAV prompt provides access to navigational data.

When initial reference index screen 190 is displayed, the navigation processor consults the state of an on-ground flag that is automatically set whenever two conditions are met: (1) the aircraft velocity, as determined by data provided by the inertial navigation system, is less than 20 knots, and (2) the squat switch associated with the landing gear indicates that the aircraft is on the ground. Whenever the on-ground flag is set and initial reference index screen 190 is displayed, the navigation processor provides a maintenance (MAINT) prompt in addition to the prompts discussed above. The MAINT prompt is associated with line select key 6L, and actuation of line select key 6L when the MAINT prompt is displayed results in a jump to maintenance BITE index screen (MAINT BITE INDEX) 196. The maintenance BITE index screen is the single entry point for all BITE systems.

As illustrated in FIG. 4, initial reference index screen 190 can be accessed in a number of ways in addition to the access from identification screen 188 described above. Many of the screens displayed by the FMCS during its operation include an index prompt associated with line select key 6L, as indicated by screen 198 in FIG. 4. When any such screen is displayed, actuation of line select 6L will cause an immediate jump to initial reference index screen 190. In addition, actuation of the INIT key 168 of CDU 20 (FIG. 3) whenever the aircraft is on the ground and the IRS position has not been initialized will cause the navigation processor to jump to position initialization (POSITION INIT) screen 192. The POSITION INIT screen provides a means of initializing the reference position for IRS alignment. As indicated in FIG. 4, the POSITION INIT screen includes an index prompt, and actuation of line select key 6L when the POSITION INIT screen is displayed will result in transfer to initial reference index screen 190.

Maintenance BITE index screen 196 includes prompts for FMCS, DFCS, A/T and IRS, as well as an index prompt. Actuation of the line select key corresponding to the FMCS prompt will result in access to FMCS BITE 70 (see FIG. 1). Actuation of the line select key corresponding to the DFCS prompt results in access to DFCS BITE 72. Actuation of the line select key corresponding to the A/T prompt results in access to AUTOTHROTTLE BITE 74. Actuation of the line select key corresponding to the IRS prompt results in entry to IRS BITE 76.

Figure 5:
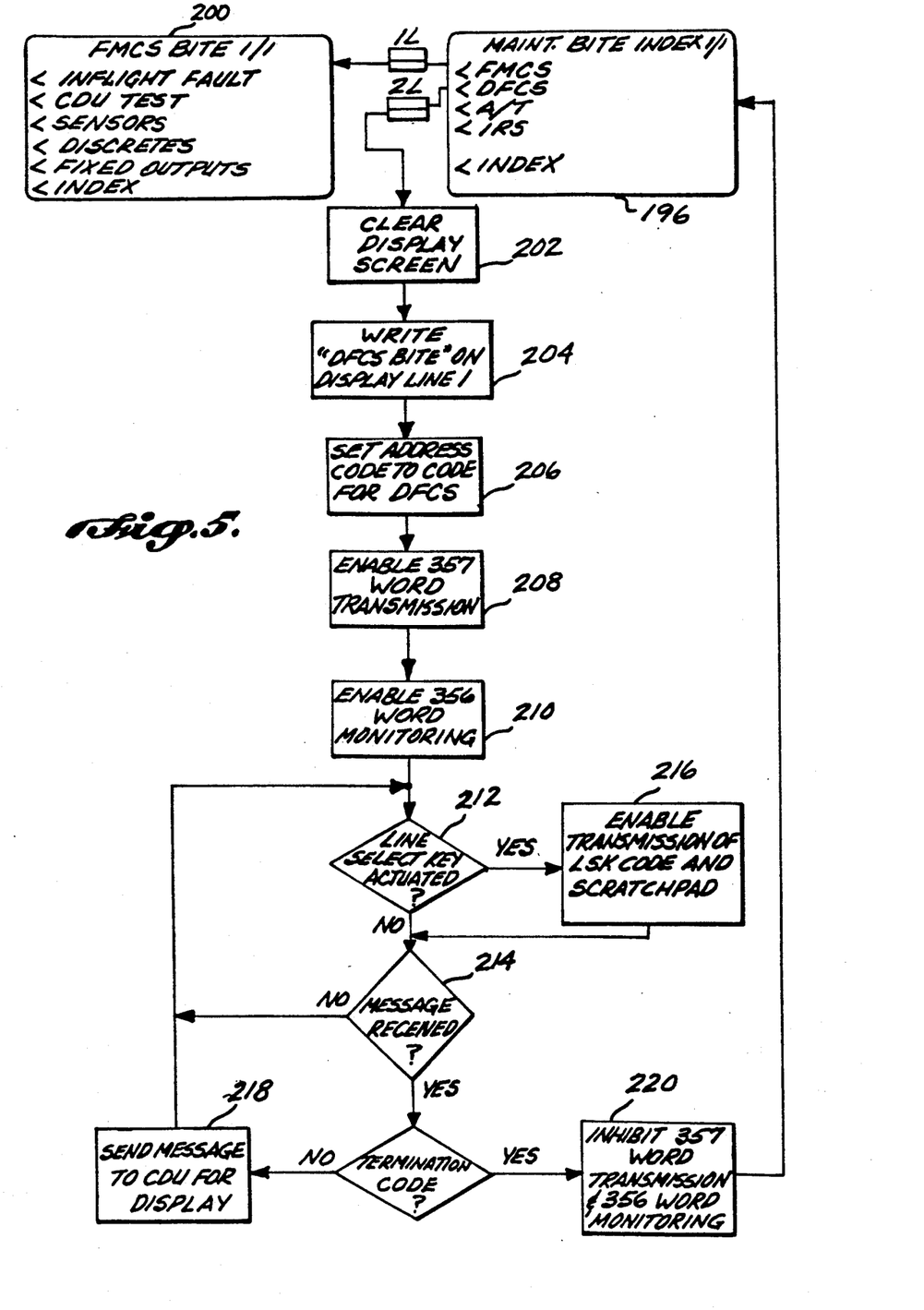
FIG. 5 is a flow diagram showing the passthrough logic.

Access to the FMCS BITE and DFCS BITE is illustrated in greater detail in FIG. 5. Actuation of line select key 1L while maintenance BITE index screen 196 is displayed results in transfer of control to the FMCS BITE program and the display of FMCS BITE screen 200. The FMCS BITE screen presents a number of options available through the FMCS BITE program. Selection of the INFLT FAULT option permits a recorded failure history display of all LRUs providing data to the FMCS BITE program for up to nine previous flights. Selection of CDU TEST permits access to a CDU display test in which all available characters are displayed on display screen 22, and a CDU key test in which the operator may interactively verify the operation of CDU keys, including line select keys 26. Selection of the SENSOR option permits inspection of the status of all sensor inputs to the FMCS. Selection of the DISCRETES option permits inspection of the state of all discrete inputs to the FMCS. Selection of the FIXED OUTPUTS option permits inspection of fixed aircraft parameters such as N1 limit, HSI ground speed, etc. These various options available through the FMCS BITE page do not per se form part of the present invention, but are outlined above to provide a general indication of the scope of a BITE program in a current generation flight management system.

Actuation of line select key 2L when maintenance BITE index screen 196 is displayed results in the activation of passthrough logic 78 (FIG. 1), whereby FMCS 12, and particular navigation processor 120, is transformed into a passthrough unit, and effective control of CDU 20 is turned over to DFCS BITE program 72 in DFCS 14. Operation of the passthrough logic is illustrated in FIG. 5. When the DFCS option is selected from maintenance BITE index screen 196, the navigation processor first clears display screen 22 in block 202, and then in block 204 writes the legend "DFCS BITE" on line 1 of display area 160. The navigation processor in block 206 then sets an address code to the code corresponding to the DFCS BITE. This is the address code that will be used in address field 74 (FIG. 2b) in order to uniquely address DFCS BITE 72, as opposed to other distributed BITE systems in the avionic system. In block 208, the navigation processor then enables 357 word transmissions. When such transmissions are enabled, I/O processor 124 operates to automatically send a 357 start word (having a word count of zero and an address equal to the address code set in block 206) whenever no 357 words have been sent during the preceding 200 milliseconds, as well as at the time 357 transmissions are initially enabled. Thus when block 208 is executed, a 357 start word having a word count of zero and the address of the DFCS BITE program is issued by FMCS 12 on bus 40. As described below, this initial 357 start word constitutes a "wake up" message that causes DFCS 14 to interrupt its current operations and to transfer control of the DFCS to DFCS BITE 72.

The next operation performed by the navigation processor is to enable 356 word monitoring in block 210. When 356 monitoring is enabled, I/O processor 124 continually checks to ensure that 356 words have been received from the activated distributed BITE system (i.e., DFCS BITE 72 in this example) within the preceding 800 milliseconds). Whenever no 356 words from the DFCS BITE system have been received during such an interval, the I/O processor interrupts the navigation processor, and the navigation processor responds by blanking lines 2–13 of display area 160, and writing the message DFCS BITE INOP in line 3 of the display area to indicate that the DFCS BITE is not responding.

Once 356 word monitoring has been enabled, the navigation processor enters a background loop in which the navigation processor waits for the actuation of a line select key (block 212) or the receipt of a message from the activated DFCS BITE (block 214). Whenever a data is received from CDU 20 indicating that a line select key has been actuated, the navigation processor enables transmission of such data to the activated DFCS BITE via bus 40. Such transmission is then carried out by processor I/O 124. The data is transmitted as a sequence of one or more 357 words transmitted at 50 millisecond intervals. The 357 start word is in the format illustrated in FIG. 2b with the address of the activated distributed BITE system (as set in block 206) and a word count indicating the number of continuation words. Each continuation word has the general format shown in FIG. 2c. The first continuation word contains a code corresponding to the actuated line select key in data field 84, and zeros in the other data fields. Further 357 continuation words transmit the characters, if any, contained in scratch pad 162. The first character in scratch pad 162 is transmitted in data field 84, the following character is transmitted in data field 86, etc. The end of the scratch pad data is indicated by a 357 continuation word having a code of 01 in its SSM field.

Messages received by FMCS 12 from the activated distributed BITE system are initially processed by I/O processor 124 and stored by the I/O processor in global RAM memory 140. When a complete message has been received, navigation processor 120 examines the message and determines whether or not the message comprises a termination code. A message that comprises a termination code includes a 356 start word having a word count field equal to 1 followed by a 356 continuation word having a special termination code in data field 108 (FIG. 2e) and zeros in the other data fields. If the message does not comprise a termination code, the data comprising the message is transmitted in block 218 to CDU 20 for display in display area 160. If the message does comprise a termination code, 357 word transmission and 356 word monitoring are inhibited in block 220, and the navigation processor exits from the passthrough logic and returns to maintenance BITE index screen 196.

From maintenance BITE index screen 196, the operator can either select another BITE system, or return to initial reference index screen 190 (FIG. 4). Selection of the A/T or IRS prompts from the maintenance BITE index screen results in a passthrough sequence parallel to that just described for the DFCS prompt, e.g., the message displayed in block 204 corresponds to the selected system, the messages generated by the FMCS contain the address of the selected distributed BITE system in the address field of the 357 start words, and the bus monitored for 356 words is the bus returning from the computer system containing the selected distributed BITE system.

Figure 6:
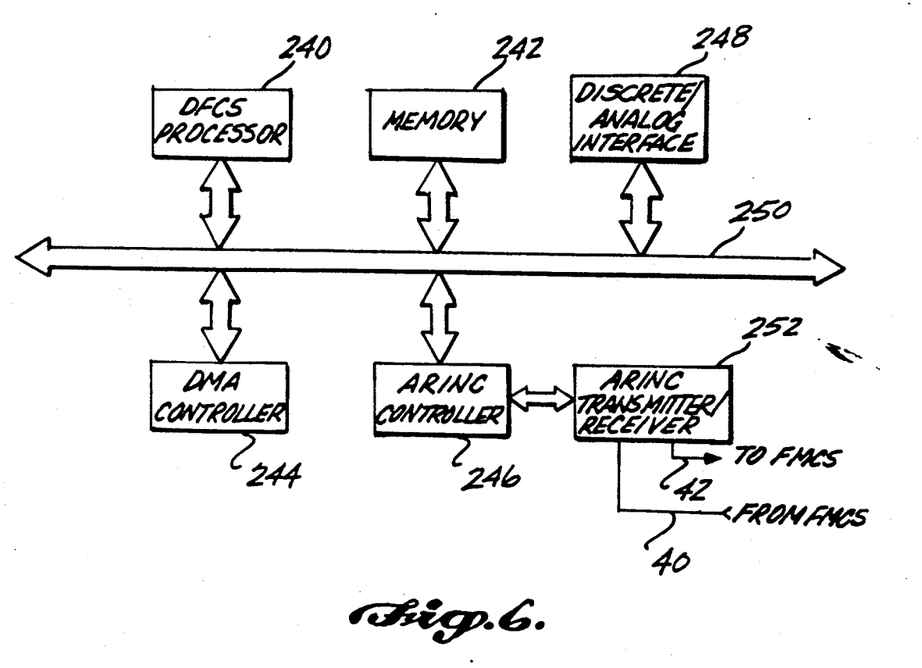
FIG. 6 is a block diagram of the DFCS.

A block diagram of DFCS 14 is set forth in FIG. 6. The DFCS comprises DFCS processor 240, memory 242, DMA controller 244, ARINC controller 246, and discrete/analog interface 248 interconnected by bus 250. ARINC controller 246 sends and receives ARINC 429 words via ARINC transmitter/receiver 252. In FIG. 6, buses 40 and 42 from and to FMCS 12 are illustrated. ARINC 429 words from the FMCS via bus 40 are received by ARINC controller 246, and then transferred to predetermined locations in memory 242 by DMA controller 244. The memory locations used by the DMA controller to store such incoming data are determined by the DMA controller based upon the label field of the ARINC 429 words. When data is to be sent from the DFCS to FMCS 12, data from memory 242 is transferred by DMA controller 242 to ARINC controller 246, and the ARINC controller causes ARINC transmitter/receiver 252 to transmit the data as ARINC 429 words over bus 42.

Figure 7:
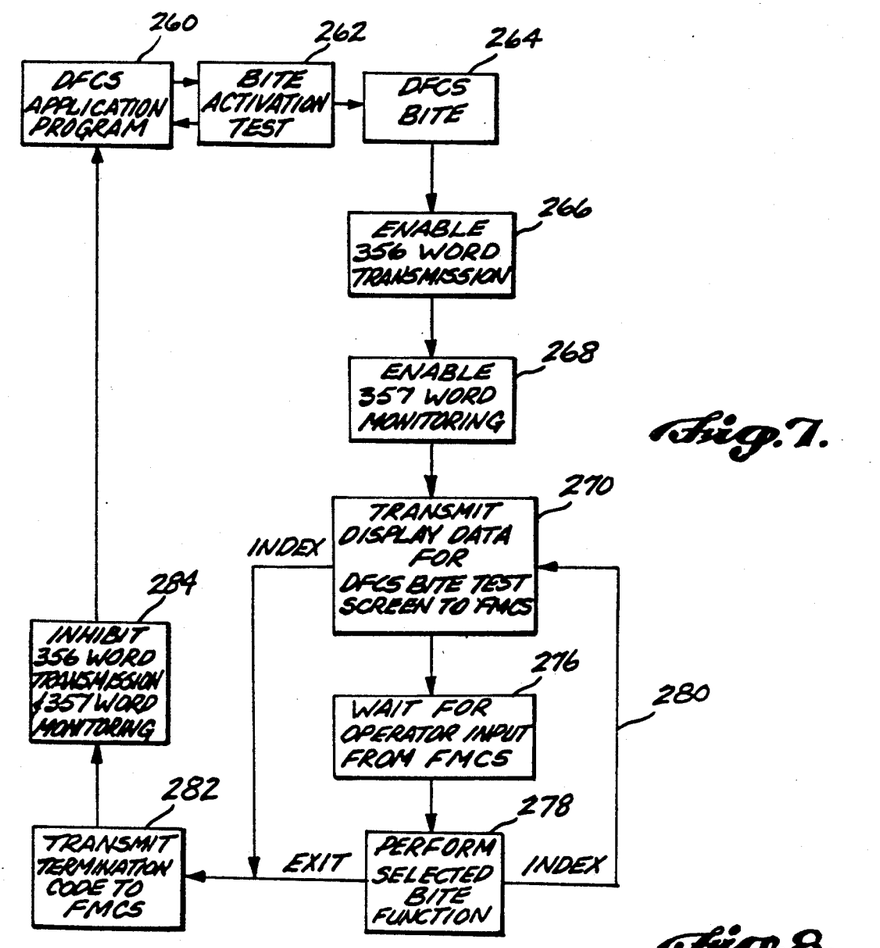
FIG. 7 is a flow diagram showing a process by which the DFCS BITE is accessed; and, FIG. 8 is a diagram showing the top level DFCS BITE screens.
Figure 8:
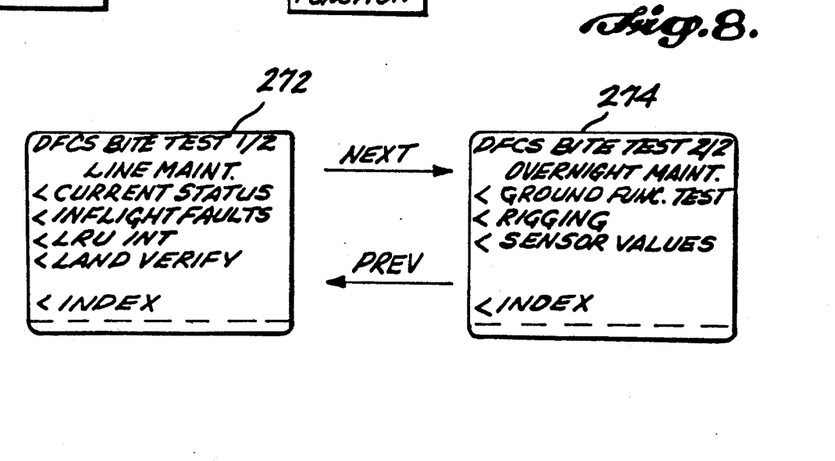

The method by which DFCS BITE 72 is accessed is illustrated in FIGS. 7 and 8. In FIG. 7, block 260 represents any non-BITE DFCS application program. The DFCS application program periodically (e.g., every 100 milliseconds) executes BITE activation test module 262.

The BITE activation test module inspects the locations in memory 242 that are reserved for the storage of 357 words received on bus 40. If no 357 data has been received, BITE activation test module 262 returns to the DFCS application program. However if 357 data (e.g., a wake-up message) has been received from the FMCS, then BITE activation test module 262 first confirms that the data includes the 357 label, and then checks the address field. If the label is not 357 or if the DFCS address is not specified, then the BITE activation test module returns to the DFCS application program. If both tests are satisfied, then the BITE activation test module performs a series of further tests. These further tests determine whether the autopilot is disengaged, whether the aircraft ground speed is less than 20 knots or the computed airspeed is less than 60 knots, and whether the squat switch indicates that the aircraft is on the ground. If any one of these tests is not satisfied, the BITE activation test module returns to the DFCS application program.

If all tests are satisfied, then control is transferred to the DFCS BITE commencing at block 264. The DFCS BITE program enables 356 word transmission in block 266, and enables 357 word monitoring in block 268. When 356 word transmission has been enabled, the DFCS will periodically (e.g., every 200 milliseconds) transmit a 356 word to the FMCS even if the DFCS BITE program has not output to send at that time. The 356 message will consist of a single 356 start word (FIG. 2d) with a word count of zero. As described above, the FMCS uses such 356 words to confirm that the DFCS is operative. When 357 word monitoring is enabled, the DFCS BITE monitors bus 40 for the periodic receipt of 357 words from the FMCS. As described above, the FMCS generates such words at least once every 200 milliseconds. If such words are not received for a period of 800 milliseconds (after 357 word monitoring has been enabled), then an exit is taken from the DFCS BITE, and control is returned to teh DFCS application program. This sequence of operations occurs whenever the INIT key is actuated when the DFCS BITE program is running.

In block 270, the DFCS BITE transmits the display data for the top level DFCS BITE screen to the FMCS via DMA controller 244, ARINC controller 246 and bus 42. The top level DFCS BITE screen is designated DFCS BITE TEST, and comprises subpages or screens 272 (½) and 274 (2/2), as illustrated in FIG. 8. The operator can move between screens 272 and 274 by means of NEXT key 172 and PREV key 174 (FIG. 3). When a given screen is displayed, the operator has the choice of selecting any of displayed options. The line maintenance options are presented on screen 272, and the overnight maintenance options are presented by screen 274.

DFCS 14 transmits the data for screen 272 or 274 to FMCS 12 as a 356 start word (FIG. 2d) followed by a series of 356 continuation words (FIG. 2e). The 356 words are transmitted at 10 millisecond intervals. The DFCS formats the 356 words in accordance with the conventions established by CDU 20 for the display of data on display screen 22. Such conventions preferably include the use of control codes for horizontal tab and carriage return. For example, the display procedure may include the following conventions.

1. Characters transmitted prior to a horizontal tab or carriage return are displayed left justified on line 2 of display screen 22.

2. If a horizontal tab followed by a character string is transmitted, the character string is displayed left justified beginning in column 13 of the display screen.
3. A carriage return causes the next character string to be displayed on the next line.
4. A character string immediately followed by a carriage return shall be displayed left justified.
5. Blank lines may be transmitted by transmitting repeated carriage returns.
6. The end of display is signalled by transmission of a 356 word having the code 01 in the SSM field. All remaining display space on display screen 22 following receipt of such a 356 word shall be left blank.

When data for display is included in a 356 message, the previous state of the display screen will be lost. If no display data is included, the display will remain unchanged.

When either screen 272 or 274 is displayed, the DFCS BITE program waits in block 276 for the receipt of operator input from FMCS 12. Such operator input may comprise a message consisting of 357 words that indicate that a line select key has been actuated. If the acuated line select key corresponds to one of the active options, as indicated by the carets on screens 272 and 274, then the DFCS BITE program proceeds to run the requested option (block 278). As long as the operator remains in DFCS BITE program, screens 272 or 274 may be accessed by one or more selections of the index option, as indicated by line 280. On the other hand when the DFCS BITE is exited, either by completion of a test sequence or operator seclection of an EXIT option, a termination code message is generated and transmitted to the FMCS in block 282, 356 word transmission and 357 word monitoring are inhibited in block 284, and control returns to the DFCS application program. As described above, when the termination code is received by the FMCS passthrough logic, the FMCS leaves the passthrough mode and reactivates MAINT BITE INDEX screen 196 (FIG. 5). In FIG. 7, block 282 (and therefore the MAINT BITE INDEX screen) may also be reached by selecting the index option from screens 272 or 274. The operation of the other distributed BITE programs, such as AUTOTHROTTLE BITE 74 and IRS BITE 76, as well as the methods of access to and exit from such programs, are analagous to those described for DFCS BITE 72.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A digital avionics system designed for installation in an aircraft as an integral part thereof, the system comprising:
   a plurality of line replaceable units (LRUs), each designed to transmit an output signal containing information from which faulty operation of said each LRU may be detected;
   a distributed computer system, designed for installation in an aircraft as an integral part thereof, coupled to said plurality of LRUs, for receiving said output signals provided by said plurality of LRUs, said computer system comprising a built-in test equipment (BITE) program (a) for performing diagnostic operations using said information in said output signals so as to isolate faulty ones of said plurality of LRUs and (b) for performing test operations after faulty LRUs have been replaced to verify replacement LRUs function properly, said BITE program comprising an interactive, natural language interface for facilitating operation of said BITE program by a user thereof; and
   control/display means, designed for installation in the cockpit of the aircraft, coupled to said distributed computer system, for permitting a user of the avionics system to communicate therewith, and for permitting a maintenance technician to operate said BITE program using said interactive, natural language interface.

2. A system according to claim 1, wherein said BITE program is a distributed BITE program distributed within said distributed computer system, further wherein said distributed computer system includes a central computer coupled to selected ones of said plurality of LRUs and to said control/display means, said central computer including a central BITE program for providing fault data with respect to said selected ones of said plurality of LRUs, said control/display means also comprising selection means for permitting a user to select either said distributed BITE program or said central BITE program.

3. A system according to claim 2, wherein said control/display means comprises a screen display and input means, further wherein said central computer further comprises pass-through means, coupled to said distributed computer system (a) for causing input data received from said input means to be formatted in a predefined format and to be transmitted from said input means through said central computer to said distributed computer system and (b) for receiving output data transmitted from said distributed computer system and for transferring such data through said central computer to said screen display for display thereon.

4. A system according to claim 1, wherein said BITE program comprises a plurality of discrete BITE programs distributed within said distributed computer system, each discrete BITE program being designed to perform said diagnostic operations and said test operations with respect to a predetermined group of said plurality of LRUs.

5. A system according to claim 4, wherein said interactive, natural language interface includes first menu means for permitting a user to access a selected one of said plurality of discrete BITE programs, and second menu means for permitting a user to initiate, operate, and terminate, within said selected one of said plurality of discrete BITE programs, said diagnostic operations and said test operations.

6. A system according to claim 1, further wherein the aircraft in which the avionics system is designed to be installed includes a plurality of subsystems for controlling the operation of the aircraft, and wherein said distributed computer system of said avionics system includes:
   an application program for controlling the operation of at least a portion of at least one of said plurality of subsystems of the aircraft; and control means for transferring control between said application program and said BITE program, said control means including interlock means for permitting the transfer of control from said application program to said BITE program only when information in the output signals from selected ones of said plurality of LRUs indicate the aircraft is on the ground.

7. A system according to claim 1, wherein said BITE program comprises:
an in-flight module for storing said information in said output signals from said plurality of LRUs received during a predetermined number of flights; and
a ground module for performing said diagnostic operations and said test operations using said information stored by said in-flight module.

8. A digital avionics system designed for installation in an aircraft as an integral part thereof, the system comprising:
a plurality of line replacement units (LRUs), each designed to transmit an output signal containing information from which faulty operation of said each LRU may be detected;
a distributed computer system, designed for installation in an aircraft as an integral part thereof, coupled to said plurality of LRUs, for receiving said output signals provided by said plurality of LRUs, said computer system comprising a plurality of discrete built-in test equipment (BITE) programs distributed within said distributed computer system each (a) for performing diagnostic operations using said information in said output signals so as to isolate faulty ones of said plurality of LRUs and (b) for performing test operations after faulty LRUs have been replaced to verify replacement LRUs function properly, said distributed computer system including a central computer having (1) a central BITE program (a) for performing diagnostic operations using said information in said output signals so as to isolate faulty ones of said plurality of LRUs and (b) for performing test operations after faulty LRUs have been replaced to verify replacement LRUs function properly and (2) selection means for permitting a user to select either said central BITE program or one of said plurality of discrete BITE programs, said central BITE program and each of said plurality of discrete BITE programs comprising an interactive, natural language interface for facilitating operation thereof by a user of the system;
control/display means, designed for installation in the cockpit of the aircraft and coupled to said distributed computer system, for permitting a user of the avionics system to communicate therewith, and for permitting a maintenance technician to operate said central BITE program and each of said plurality of discrete BITE programs using said interactive, natural language interface, the latter including first menu means for permitting a user to access said central BITE program or a selected one of said plurality of discrete BITE programs, and second menu means for permitting a user to initiate, operate, and terminate, within said central BITE program or said selected one of said plurality of discrete BITE programs, said diagnostic operations and said test operations, said control/display means comprising a screen display and input means; and
wherein said central computer additionally includes pass-through means, coupled to said distributed computer system (a) for causing input data received from said input means to be formatted in a predefined format and to be transmitted from said input means through said central computer to said distributed computer system and (b) for receiving output data transmitted from said distributed computer system and for transferring such data through said central computer to said screen display for display thereon.

9. A digital avionics system designed for installation in an aircraft, the system comprising:
a plurality of line replaceable units (LRUs), each designed (a) to receive an input signal and (b) to transmit an output signal containing information from which faulty operation of said each LRU may be detected;
a distributed computer system, designed for installation in an aircraft and coupled to said plurality of LRUs, for generating and providing said input signals to said plurality of LRUs and for receiving said output signals provided by said plurality of LRUs, said distributed computer system comprising a distributed built-in test equipment (BITE) program distributed within said distributed computer system having (a) an in-flight module for storing said information in said output signals from said plurality of LRUs receiving during a predetermined number of flights and (b) a ground module for performing diagnostic operations using said information stored by said in-flight module so as to isolate faulty ones of said plurality of LRUs and for performing test operations after faulty LRUs have been replaced to verify replacement LRUs function properly; and
interface means, designed for installation in the cockpit of the aircraft and coupled with said distributed computer system, for permitting a maintenance technician to operate said ground module portion of said BITE program.

10. A system according to claim 9, further wherein said interface system includes means for permitting flight personnel to communicate with the avionics system from the cockpit of the aircraft.

11. A system according to claim 9, wherein said distributed computer system comprises a central computer coupled to selected ones of said plurality of LRUs and to said interface means, said central computer including a central BITE program having (a) an in-flight module for storing information in said output signals from said selected ones of said plurality of LRUs received during a predetermined number of flights and (b) a ground module for performing diagnostic operations using said information stored by said in-flight module so as to isolate faulty ones of said selected ones of said plurality of LRUs and for performing test operations after faulty LRUs have been replaced to verify replacement LRUs function properly.

12. A system according to claim 11, wherein said interface means includes a screen display for receiving and displaying data and a keyboard for transmitting data, said central computer additionally including pass-through means, coupled to said distributed computer system, (a) for causing data transmitted from said keyboard to be formatted in a predefined format and to be transmitted from said keyboard via said central computer, to said distributed computer system and (b) for receiving output data transmitted from said distributed computer system and for transferring such data via said central computer to said screen display for display thereon.

13. A built-in test equipment (BITE) system designed to form an integral part of a digital avionic system installed in an aircraft, the avionic system comprising (1) a plurality of line replaceable units (LRUs), each designed (a) to receive an input signal and (b) to transmit an output signal containing information from which faulty operation of said each LRU may be detected, (2) a distributed computer system, coupled to said plurality of LRUs, for generating and providing said input signals to said plurality of LRUs and for receiving said output signals provided by said plurality of LRUs, and (3) interface means for permitting a user to communicate with said distributed computer system, the BITE system comprising:

(a) in-flight means for storing said information in said output signals received by the distributed computer system from the plurality of LRUs;

(b) ground means for performing diagnostic operations using said information stored by said in-flight means so as to isolate faulty ones of said plurality of LRUs and for performing test operations after faulty LRUs have been replaced to verify replacement LRUs function properly;

(c) communication means for providing a user-interactive, natural language interface with said in-flight means and said ground means; and (d) wherein said in-flight means, said ground means, and said communications means are distributed within said distributed computer system.

14. A system according to claim 13, wherein the aircraft in which the digital avionics system is installed comprises a plurality of subsystems for controlling the operation of the aircraft, each of said subsystems being coupled to selected ones of said plurality of LRUs, further wherein said BITE system comprises:

an application program for controlling the operation of at least a portion of at least one of the subsystems of the aircraft;

control means for transferring control between said application program and said ground means, wherein said control means comprises interlock means for preventing transfer of control between said application program and said ground means except when the aircraft is on the ground.

15. A digital avionics system designed for installation in an aircraft having a plurality of subsystems for controlling the operation of the aircraft, each of said subsystems comprising a plurality of line replaceable units (LRUs), each of which is designed to provide an output signal containing information from which faulty operation of the LRU may be determined, the system comprising:

a distributed computer system designed to be installed in an aircraft so as to be coupled to the LRUs of selected subsystems of the aircraft, said distributed computer system including:

(i) application means for controlling the operation of at least a portion of at least one of said plurality of subsystems of the aircraft;

(ii) built-in-test equipment (BITE) means for performing diagnostic testing of the LRUs of said at least a portion of at least one of the selected subsystems based on information in the output signals of said LRUs; and (iii) control means for transferring control between said application means and said BITE means, said control means including interlock means for permitting the transfer of control from said application means to said BITE means only when information in the output signals from selected LRUs of the aircraft indicate the aircraft is on the ground.

* * * * *

UNITED STATES PATENT AND TRADEMARK OFFICE
CERTIFICATE OF CORRECTION

PATENT NO. : 5,184,312
DATED : February 2, 1993
INVENTOR(S) : G. F. Ellis It is certified that error appears in the above-identified patent and that said Letters Patent is hereby corrected as shown below:

| COLUMN | LINE | |
|---|---|---|
| 14 | 28 | "not" should read --no-- |
| 17 (Claim 8 | 17 Line 4) | "replacement" should read --replaceable-- |

Signed and Sealed this

Seventh Day of December, 1993

BRUCE LEHMAN

*Attest:*

*Attesting Officer*  *Commissioner of Patents and Trademarks*